United States Patent
Usherovich

(10) Patent No.: US 6,363,836 B1
(45) Date of Patent: *Apr. 2, 2002

(54) ROTISSERIE COOKER UNIT

(75) Inventor: Boris Usherovich, Staten Island, NY (US)

(73) Assignee: Franklin Industries, L.L.C., Brooklyn, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/285,518

(22) Filed: Apr. 2, 1999

Related U.S. Application Data

(60) Provisional application No. 60/080,712, filed on Apr. 3, 1998.

(51) Int. Cl.[7] .................................................. A47J 37/04
(52) U.S. Cl. ...................................... 99/339; 99/421 V
(58) Field of Search .............................. 99/419, 421 R, 99/421 V, 339, 427

(56) References Cited

U.S. PATENT DOCUMENTS

| | | | | |
|---|---|---|---|---|
| 475,678 A | * | 5/1892 | Dexter | |
| 476,746 A | * | 6/1892 | Isaacs | |
| 1,631,655 A | * | 6/1927 | Sunderland et al. | |
| 2,049,481 A | * | 8/1936 | Walterspiel | 219/35 |
| 2,121,444 A | * | 6/1938 | Osrow | 219/19 |
| 2,205,914 A | * | 6/1940 | Stafford | 53/5 |
| 2,595,010 A | * | 4/1952 | Simpson | 126/246 |
| D167,077 S | * | 6/1952 | Gunther | D81/10 |
| 2,831,420 A | * | 4/1958 | Radman | 99/357 |
| 2,949,525 A | * | 8/1960 | Dunn | 219/35 |
| 3,581,654 A | | 6/1971 | Tescula | 99/399 |
| 3,882,767 A | * | 5/1975 | Oyler et al. | 99/339 |
| 4,307,285 A | | 12/1981 | DeRemer | 219/392 |
| 4,968,515 A | * | 11/1990 | Burkett et al. | 426/233 |
| 5,170,024 A | | 12/1992 | Hanatani et al. | 219/10.55 B |
| 5,203,252 A | * | 4/1993 | Hsieh | 99/339 |
| 5,213,027 A | * | 5/1993 | Tsotso et al. | 99/339 |
| 5,539,184 A | * | 7/1996 | Su | 219/388 |
| 5,575,196 A | | 11/1996 | Masel et al. | 99/421 V |
| 5,665,258 A | * | 9/1997 | Hsu | 219/388 |
| 5,819,640 A | * | 10/1998 | Cuomo et al. | 99/483 |
| 5,845,563 A | | 12/1998 | Haring et al. | 99/419 |
| 6,089,144 A | * | 7/2000 | Garber et al. | 99/331 |

OTHER PUBLICATIONS

Welbilt Oven, Model #TBR5, page from unidentified owner's manual, date unknown.

* cited by examiner

*Primary Examiner*—Keith Hendricks
*Assistant Examiner*—Drew Becker
(74) *Attorney, Agent, or Firm*—Dilworth & Barrese, LLP

(57) ABSTRACT

A rotisserie cooker unit having a cooking chamber, control panel and convection heating assembly is provided. In one embodiment, a cooking appliance is disclosed having a cooking chamber configured for receipt of food articles and defining a cavity. A heating element is disposed within the cooking chamber. A convection heating assembly is included disposed remote from the heating element and having a receptacle removably supported within the cavity of the chamber. The appliance may include a housing. In an alternate embodiment, a rotisserie appliance is disclosed having a spit assembly disposed within the cooking chamber for relative rotation thereto and support of food articles. The appliance may also include a control unit.

3 Claims, 5 Drawing Sheets

ROTISSERIE COOKER UNIT

CROSS REFERENCE TO RELATED APPLICATION

This application claims priority to U.S. Provisional Application Serial No. 60/080,712 filed Apr. 3, 1998 by Boris Usherovich, the entire contents of which are hereby incorporated by reference.

BACKGROUND

1. Field of the Invention

The present invention relates to cooking appliances and, more particularly, to a rotisserie cooking appliance that allows simultaneous preparation of primary and secondary food articles.

2. Description of the Related Art

Rotisserie cooking units are generally known. Rotisserie cookers are used to cook food articles, such as, for example, chicken, roasts, fish, steaks, shish-kabob, etc. Rotisserie cookers are advantageous because they seal in the natural juices of the food articles while draining off unwanted fat.

Typically, rotisserie cooking units slowly rotate food articles above a heat source or heating element. The heating element is usually placed in the bottom of the cooker unit such that heat will rise to cook the food articles.

Also known in the art are rotisserie cooking units and methods whereby the food articles rotate about a vertical axis in close proximity to a heat source, usually of the resistive electric type, positioned laterally of the food articles to be cooked, or centrally along their axis of rotation. Such devices are disclosed, for example, in Wickenberg, U.S. Pat. No. 3,221,638, Geissman, U.S. Pat. No. 4,270,444, and Brown et al., U.S. Pat. Nos. 4,366,750. U.S. Pat. No. 5,575,196 to Masel et al. discloses a grilling appliance that rotates food articles and includes a first heater comprising a vertical impaling member for heating the interior of a food article and a second heater located laterally of the vertical impaling member for heating the exterior of the food article.

Additionally, horizontal rotisserie cookers are known that include a griddle fixedly mounted to the top of an oven type cooker to cook secondary food articles. These oven units include two separate heating elements whereby one heating element is horizontally positioned at the bottom of the cooker and a second heating element is horizontally positioned in close proximity, such as by welding, to the griddle.

A disadvantage of those cooker units having a fixedly mounted griddle is that the griddle is not removable from the cooker, which makes the griddle difficult to clean and prevents the griddle from being readily removed for serving purposes. In addition, due to the location of the heating element in such close proximity to the griddle, it is difficult, if not impossible, to warm or heat food, but instead the heating element (typically the broiling element) fries or grills the food at a high temperature. Further, having more than one heating element disadvantageously increases cost of manufacture resulting in increased cost to the consumer, and may require the additional cost of an additional temperature control device.

Accordingly, it is an object of the present invention to have a cooking appliance for rotisserie cooking which includes a removable heating convection assembly for preparation of food articles. It is another object of the present invention to provide a cooking appliance that provides for more uniform heating of secondary food articles.

It is yet another object of the present invention to provide a cooking appliance which includes a means for cooking primary food articles and secondary food articles.

SUMMARY OF THE INVENTION

In accordance with the present invention, a rotisserie cooker unit is provided which comprises a cooking chamber having a vertically disposed roasting rack and a vertically disposed heating element, a control panel and a convection heating assembly. The heating element may be disposed against a wall of the chamber to provide a faster means to cook food placed in the convection heating assembly.

In one embodiment, a cooking appliance is disclosed that includes a cooking chamber configured for receipt of food articles and defining a cavity. A heating element is disposed within the cooking chamber. A convection heating assembly is included disposed remote from the heating element and having a receptacle removably supported within the cavity of the cooking chamber.

The cooking appliance includes a housing configured to enclose at least a portion of the cooking chamber. The housing has a first end and a second end. The first end defines a cavity configured to removably support the receptacle of the convection heating assembly. The housing also includes a lateral opening and a door pivotably mounted to the housing. The door is pivotal between an open position and a closed position closing the lateral opening. The housing may include sidewalls having vents defined therein.

The cooking appliance includes a base enclosure whereby the cooking chamber is fixedly mounted to the base enclosure. The heating element may be vertically disposed within the cooking chamber and fixedly mounted to the base enclosure. A cooking chamber illumination source (i.e. a light) may be disposed within the cooking chamber.

In an alternate embodiment, a rotisserie appliance is disclosed including a cooking chamber configured for receipt of food articles and defining a cavity. A heating element is disposed within the cooking chamber. A spit assembly is disposed within the cooking chamber for relative rotation thereto and support of the food articles. A convection heating assembly is included disposed remote from the heating element and having a receptacle removably supported within the cavity of the cooking chamber.

The spit assembly may include a substantially cylindrical spit tray support supported within the chamber. A spit tray is supported by the spit tray support for rotation relative to the cooking chamber. A spit is removably mounted to the tray and configured for penetration and support of the food articles. The rotisserie assembly may include a rotary driver cooperatively engaging the spit tray and actuating rotation thereof.

The rotisserie assembly may include a control unit disposed within the base enclosure and having a display mounted to an outer surface of the base enclosure. The control unit may include a temperature sensor disposed adjacent the cooking chamber for detecting temperature of the cooking chamber and providing a temperature signal indicative of a predetermined temperature. The control unit is operatively responsive to receiving the temperature signal and causing deactivation of the heating element. The control unit may also include circuitry responsive to the temperature signal provided by the temperature sensor for deactivating the heating element.

The control unit may further include a timer mounted within the base enclosure for detecting expiration of a predetermined time period. The timer provides a time signal indicative of the predetermined time period. The control unit is operatively responsive to receiving the time signal and causing deactivation of the heating element. The control unit may also include circuitry responsive to the time signal provided by the timer for deactivating the heating element.

In another alternate embodiment, a rotisserie appliance is disclosed including a spit assembly having engagement structure. The engagement structure of the spit assembly being operatively associated with the convection heating assembly to rotate the convection heating assembly.

BRIEF DESCRIPTION OF THE DRAWINGS

The accompanying drawings, referred to herein and constituting a part hereof, illustrate the exemplary embodiments of the rotisserie cooker unit of the present invention and, together with the description, serve to explain the principles of the invention.

DETAILED DESCRIPTION OF THE EXEMPLARY EMBODIMENTS

Figure 1:
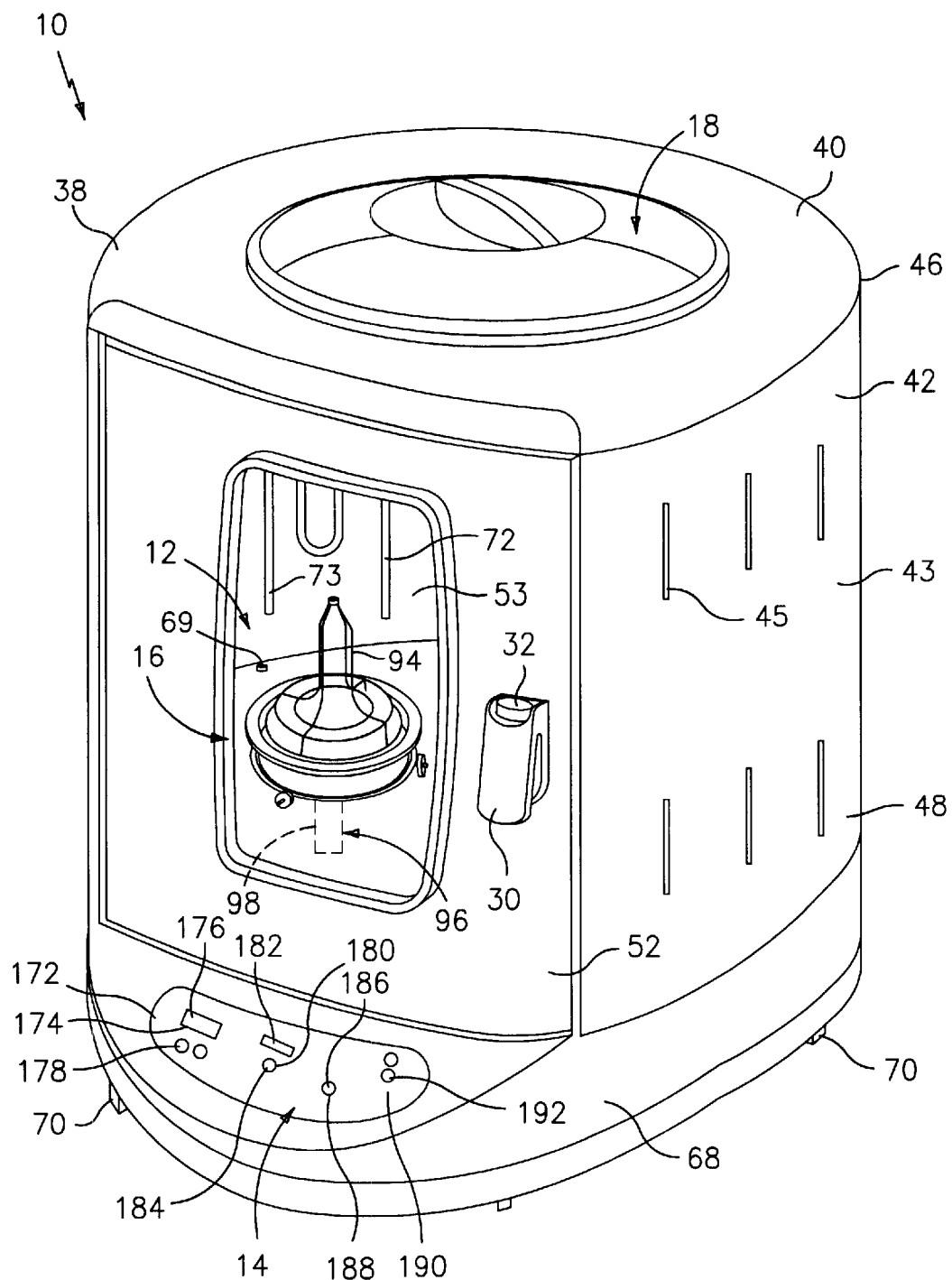
FIG. 1 is a perspective view of a rotisserie cooker unit in accordance with the present invention.
Figure 2:
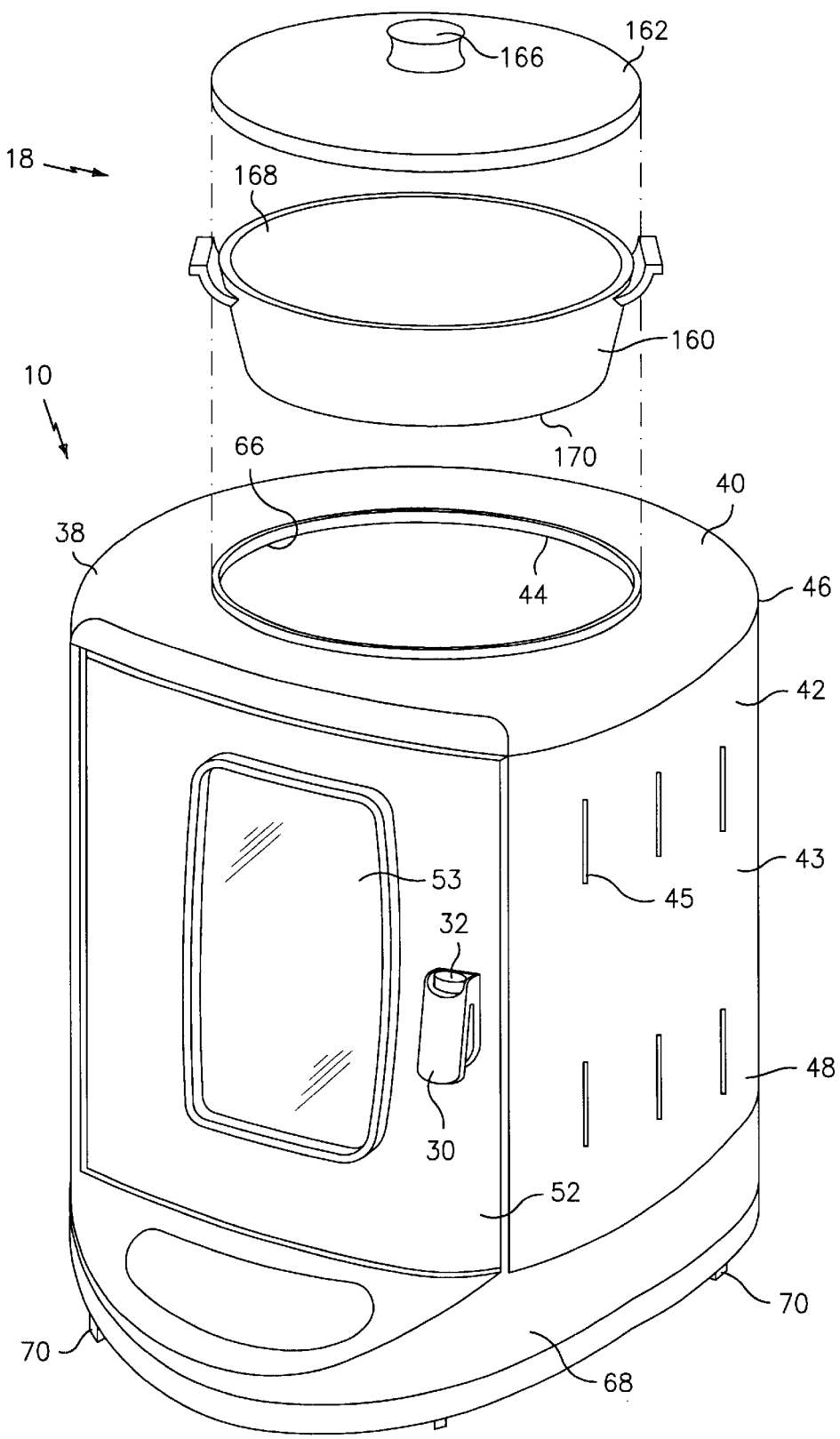
FIG. 2 is an exploded perspective view of a convection heating assembly with the rotisserie cooker unit of FIG. 1.

Referring now to the drawings in detail wherein like reference numerals identify similar structural elements of the subject invention there is illustrated in FIGS. 1 and 2 a rotisserie assembly 10, in accordance with one embodiment of the present invention. The rotisserie assembly allows the simultaneous preparation of primary food articles, such as, for example, entrees, as well as secondary food articles, such as, for example, side dishes, thereby saving time and space while simplifying clean up after preparation of the food articles. The rotisserie assembly roasts food articles while sealing in natural juices and draining off unwanted fat. As shown in FIG. 1, rotisserie cooker unit 10 includes a cooking chamber 12, a control unit 14, a spit assembly 16 and a convection heating assembly 18.

Cooking chamber 12 is enclosed by a housing 38, which is generally cylindrical, but may have various configurations such as, for example, rectangular, elliptical, etc. Housing 38 is assembled from a top portion 40 and a body portion 42. Top portion 40 is positioned onto body portion 42 in contacting relation to enclose cooking chamber 12. Top portion 40 is, preferably, fabricated from a corrosion resistant material that can be easily cleaned, such as, for example, stainless steel or aluminum. It is contemplated that top portion 40 may also be fabricated from a thermoplastic material. As shown in FIG. 2, top portion 40 defines a reception cavity 44 for removable support of convection heating assembly 18, as will be discussed hereinbelow.

Body portion 42 is, preferably, fabricated from a relatively durable material that can be easily cleaned, such as, for example, a polymeric material, synthetic plastics, etc., and metals such as, for example, stainless steel and aluminum. One skilled in the art will realize, however, that the components of housing 38 may be fabricated from other materials in a variety of fabrication methods suitable for a cooking appliance. It is further contemplated that housing 38 may be formed as a monolithic unit.

Referring to FIGS. 1 and 2, body portion 42 includes sidewalls 43 having vents 45 defined therein. Vents 45 provide an advantageous degree of safety to rotisserie cooking unit 10 during operation. Vents 45 facilitate cooling of housing 38 during operation so that housing 38 may be manually contacted. The vents also cooperate with a thermostat provided with the appliance to control the temperature of the appliance.

Figure 4:
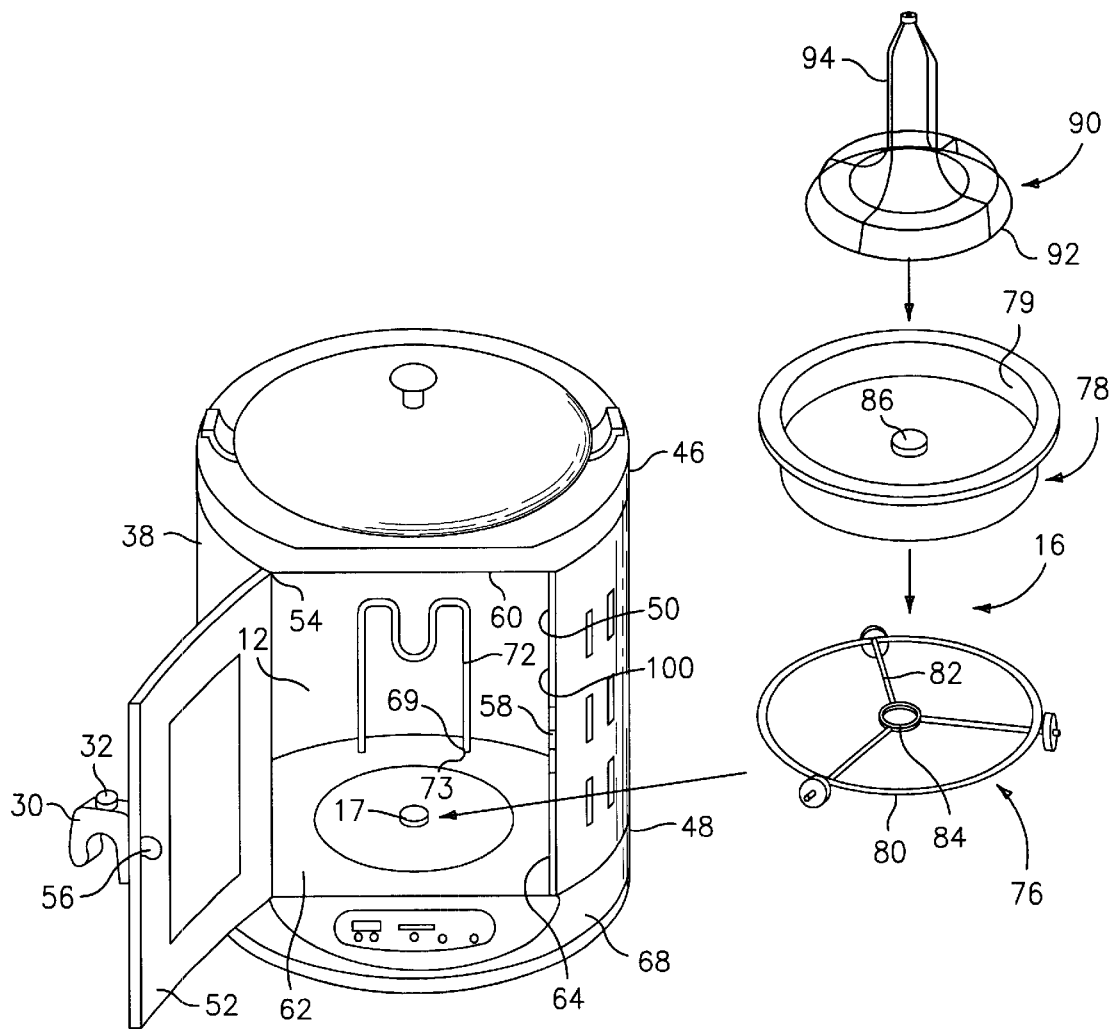
FIG. 4 is a front perspective view of the rotisserie cooker unit of FIG. 1 showing a spit assembly with parts separated.

Referring now to FIG. 4, housing 38 has a first end 46, a second end 48 and a lateral opening 50. Housing 38 includes door 52 pivotally mounted thereto. As shown in FIGS. 1 and 2, door 52 includes a window 53 centrally positioned therewithin. It is contemplated that window 53 may be positioned at various locations on door 52. Window 53 is transparent for viewing food articles supported within cooking chamber 12.

Door 52 is mounted to body portion 42 by a pivotal post 54 upon which door 52 rotates between the open and closed positions. Post 54 is received within a channel (not shown) defined along a vertical side of door 52. Post 54 projects into grooves or the like that are aligned with the channel for maintaining door 52 in position. A post and groove arrangement for maintaining door 52 in position may also be defined along a horizontal side of door 52. It is contemplated that door 52 may be mounted to body portion 42 by hinges, clips, etc.

As shown in FIGS. 1 and 2, door 52 includes a handle 30 having a door release button 32. Handle 30 cooperates with a latch mechanism 56 for releasably retaining door 52 in the closed position, as shown in FIG. 4. Latch mechanism 56 engages a latch receiving mechanism, such as, for example, opening 58. Button 32 is manually depressed to disengage latch mechanism 56 from opening 58 and release door 52 so that it can pivot to the open position. It is contemplated that door 52 may be maintained in the closed position alternatively by a pressure fit, bolt mechanisms, etc.

Chamber 12 is, preferably, fabricated from a thermally insulative material to facilitate efficacious heating thereof and suitable for cooking applications. It is contemplated that such material be corrosion resistant and easily cleaned, including, for example, stainless steel or aluminum. It is further contemplated that an interior surface of cooking chamber 12 have a non-stick coating, such as, for example, polytetrafluoroethylene, etc.

Figure 3:
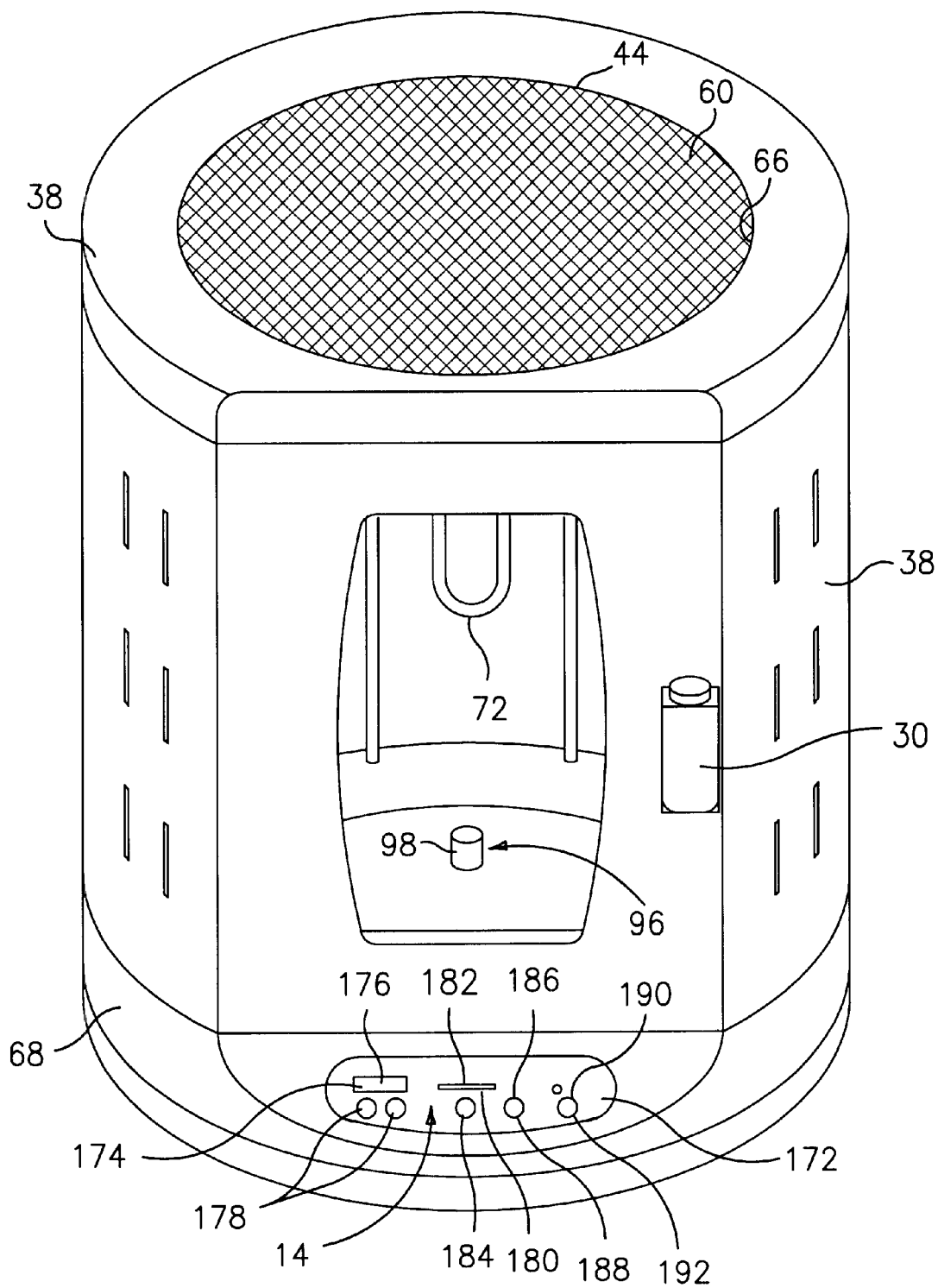
FIG. 3 is a front perspective view showing the rotisserie cooker unit of FIG. 1 having the convection heating assembly removed.

Cooking chamber 12 has a first end 60 and a second end 62, in which, referring to FIG. 3, first end 60 defines a cavity 66 substantially aligned with cavity 44 of housing 38. Referring to FIG. 2, cavity 66 removably supports convection heating assembly 18 therewithin in cooperation with cavity 44 of housing 38. Each cavity is, preferably, configured as a hole adjacent top portion 40 of housing 38. It is also contemplated that each cavity may be configured as a recess or the like for support of convection heating assembly 18. Referring to FIG. 4, second end 62 of cooking chamber 12 defines an opening 67 for receipt of a rotary driver that facilitates rotation of spit assembly 16, as will be discussed hereinbelow.

Referring to FIGS. 1 and 2, a base enclosure 68 is fixedly mounted to second end 48 of housing 38, and is fabricated from a suitable material. Base enclosure 68 includes foot pegs 70 for stabilization of rotisserie cooker unit 10. An elongated heating element 72 is vertically disposed within cooking chamber 12 and is fixedly mounted to base enclosure 68. Heating element 72 includes pin-type connectors 73 received within sockets 69 of base enclosure 68. Receipt of connectors 73 within socket 69 facilitate electrical communication between heating element 72 and a power source. It is contemplated that heating element 72 may be disposed within cooking chamber 12 in various orientations, and is of the electrically resistant type and capable of reaching suitable cooking temperatures, as is known to one skilled in the art. Heating element 72 is disposed on one side of cooking chamber 12 to cook food articles penetrably supported by spit assembly 16 and food articles placed in convection heating assembly 18, as will be discussed hereinbelow. Heating element 72, preferably, provides a range of heating temperatures up to 500° F. Although one heating element is shown, multiple heating elements may be used and positioned at various positions about cooking chamber 12.

A spit assembly 16, as shown in FIG. 1, is disposed within cooking chamber 12 for relative rotation thereto and support of food articles therewithin. As shown in FIG. 4, spit assembly 16 includes a spit tray support 76 supported within cooking chamber 12. A spit tray 78 is supported by spit tray support 76 for rotation relative to cooking chamber 12. Spit tray support 76 has a circular rim 80 and radiating bars 82 for support of spit tray 78. It is contemplated that spit tray support 76 may include a single radiating bar or multiple bars for support of spit tray 78.

Spit tray support 76 defines opening 84 and spit tray 78 defines a drive socket 86 for receipt of a spit drive that facilitates rotation of spit assembly 16 within cooking chamber 12, as will be discussed hereinbelow. Spit tray support 76 includes wheels 88 to facilitate rotation of spit assembly 16. Spit tray assembly 16 includes a spit 90 removably mounted to spit tray 78. An outer rim 92 is positioned onto spit tray 78 and in contacting relation with sidewalls 79. Spit 82 includes a vertically impaling portion 94 configured for penetration and support of food articles.

As shown in FIGS. 1 and 3, a rotary driver 96 is fixedly disposed within base enclosure 68. Driver 96 includes a spit drive 98 cooperatively engaging drive socket 86 of spit tray 78. Rotary driver 96 is actuated and, through cooperation of spit drive 98 and drive socket 86 (FIG. 4), spit assembly 16 is caused to rotate relative to cooking chamber 12. Rotary driver 96 is actuated by an electric drive motor (not shown), as known to one skilled in the art and suitable for a cooking appliance. Manual actuation is also contemplated.

Rotisserie cooker unit 10 includes a cooking chamber illumination source 100, as shown in FIG. 4, disposed within housing 38. Source 100 may include an incandescent lamp, etc., suitable for projecting light within cooking chamber 12.

Referring to FIG. 1, a control unit 14 is disposed within base enclosure 68 and has a display mounted to an outer surface of base enclosure 68. Control unit 14 controls and monitors operation of cooker unit 10 and is in communication with the power source for heating element 72. Control unit 14 includes a display, such as, for example, control panel 172. Control panel 172 is positioned at the front of cooker unit 10 for facile access thereto and programming of rotisserie cooker unit 10 for cooking. Panel 72 may be variously positioned about cooker unit 10, and is contemplated to be remotely positioned from cooker unit 10, such as, for example, by an electrical cord and remote control device.

Control panel 172 facilitates programming of operation, including cooking duration and temperature. Operation of illumination source 100 is controlled from panel 172 to monitor progress of cooking food articles both within cooking chamber 12 and heating convection assembly 18.

Control unit 14 has electrical controls including a timer control, a temperature control, an illumination control and a power control. The timer control includes a timer display 174 and a timer (not shown) that is mounted within base enclosure 68 for detecting expiration of a predetermined time period as known to one skilled in the art. Timer display 174 includes a digital display 176 that exhibits the remaining time period for a particular cooking operation, preferably, in hours and minutes. Timer display 174 includes manual push buttons 178 for programming operation of cooker unit 10 in hours and minutes. It is also contemplated that timer display 174 may be an analog timer.

The timer provides a time signal to control unit 14 when the programmed time period expires. Control unit 14 is operatively responsive to receiving the time signal. Control unit 14 deactivates heating element 72, thereby discontinuing heating by element 72.

The temperature control includes a temperature display 180 and a temperature sensor (not shown) that is disposed adjacent to cooking chamber 12 for detecting temperature of cooking chamber 12, as is known to one skilled in the art. Temperature display 180 includes a range display 182 that exhibits the range of programmable temperatures for operation of cooker unit 10. The cooking temperature may be programmed by manually depressing a push button 184. It is contemplated that the temperature may be programmed using levers, switches, an analog control, etc. Each temperature programmed may be highlighted or indicated by an LED or other suitable means as is known to one skilled in the art.

The temperature sensor provides a temperature signal to control unit 14 when cooking chamber 12 reaches a determined temperature, as set within the programmable temperature range shown by range display 182. Upon reaching the programmed temperature setting and the temperature signal being received by control unit 14, control unit 14 is operatively responsive to receiving the temperature signal. Control unit 14 deactivates heating element 72, thereby discontinuing heating by heating element 72.

The illumination control includes an illumination display 186. Illumination display 186 includes manual push button 188 for activating illumination source 100.

The power control includes a display 190. Display 190 includes a manual push button 192 that facilitates electrical communication between an electrical power source and heating element 72. Depressing push button 192 also facilitates electrical communication between the power source and the motor assembly, described above. The motor assembly thereby causes actuation of rotary driver 96 causing rotation of spit assembly 16. Upon facilitating communication between the electrical power source and heating element 72, and the power source and the motor assembly, the "on" condition is indicated by an LED or other suitable means as is known to one skilled in the art. It is contemplated that the power control may facilitate electrical communication between the power source and other components of rotisserie cooker unit 10.

Referring to FIG. 2, a convection heating assembly 18 is removably supported within cavity 44 of housing 38 and cavity 66 of cooking chamber 12 and in communication with cooking chamber 12 for preparation of food articles, such as, for example, vegetables, stuffing, soups, sauces, side dishes, etc. Convection heating assembly 18 has a receptacle 160 and a cover 162.

Receptacle 160 may be fabricated from stainless steel, aluminum or other suitable corrosion resistant material which are easily cleaned and thermally conductive. It is contemplated that receptacle 160 may also be fabricated from a suitable polymeric material, borosilicate glass, etc. Cover 162 may be fabricated from a thermally insulative material that is easily cleaned and corrosion resistant, such as, for example, borosilicate lass. It is contemplated that cover 162 may also be constructed from metals, or polymeric materials which are suited to withstand high temperatures created during operation of rotisserie cooker unit 10.

Receptacle 160 has a first surface 168 and a second surface 170. First surface 168 is configured for receipt of food articles and may include a non-stick coating such as, for example, polytetrafluorethylene. Second surface 170 is configured for removable support within cavity 44 of top portion 40 of housing 38 and cavity 66 of cooking chamber 12. Second surface 170 is in communication with cooking chamber 12 for cooking of food articles received within receptacle 160. It is contemplated that receptacle 160 may include handles that facilitate removal of heating convection assembly 18 from cooker unit 10 and serving of food articles prepared therewithin. Heating convection assembly 18 is configured to prepare food articles, such as, for example, baking, steaming, boiling, braising, simmering, warming, etc.

Convection heating assembly 18 is heated by heat transfer by convection from heating element 72, thereby preparing food articles disposed within receptacle 160. Heating element 72 heats air within cooking chamber 12 which is circulated to second surface 170 of receptacle 160 to food articles disposed therein. Cover 162 prevents heat loss during cooking.

In operation, the embodiment of rotisserie cooker unit 10 in accordance with the present invention, as shown in FIGS. 1–4, facilitates preparation of primary food articles, such as, for example, entrees, and secondary food articles, such as, for example, side dishes.

The food article, such as, for example, poultry, is supported by spit assembly 16. Vertical impaling portion 94 of spit 90 is inserted into a cavity of the poultry. The poultry and spit 90 are positioned onto spit tray 78, on spit tray support 76, centrally positioned within cooking chamber 12, as described hereinabove. Secondary food articles are placed within receptacle 160 and covered by cover 162.

Rotisserie cooker unit 10 is programmed for a desired time period and temperature from control panel 172 of control unit 14, as described hereinabove. Heating element 72 and the motor assembly are activated. Spit assembly 16 is caused to rotate within cooking chamber 12 for preparation of food articles. The food articles supported by spit assembly 16 and disposed within convection heating assembly 18 are simultaneously prepared. Upon expiration of the desired time period, the motor assembly and heating element 72 are deactivated. Convection heating assembly 18 is removed form rotisserie cooker unit 10 and the food articles prepared within assembly 18 may be readily served therefrom.

Figure 5:
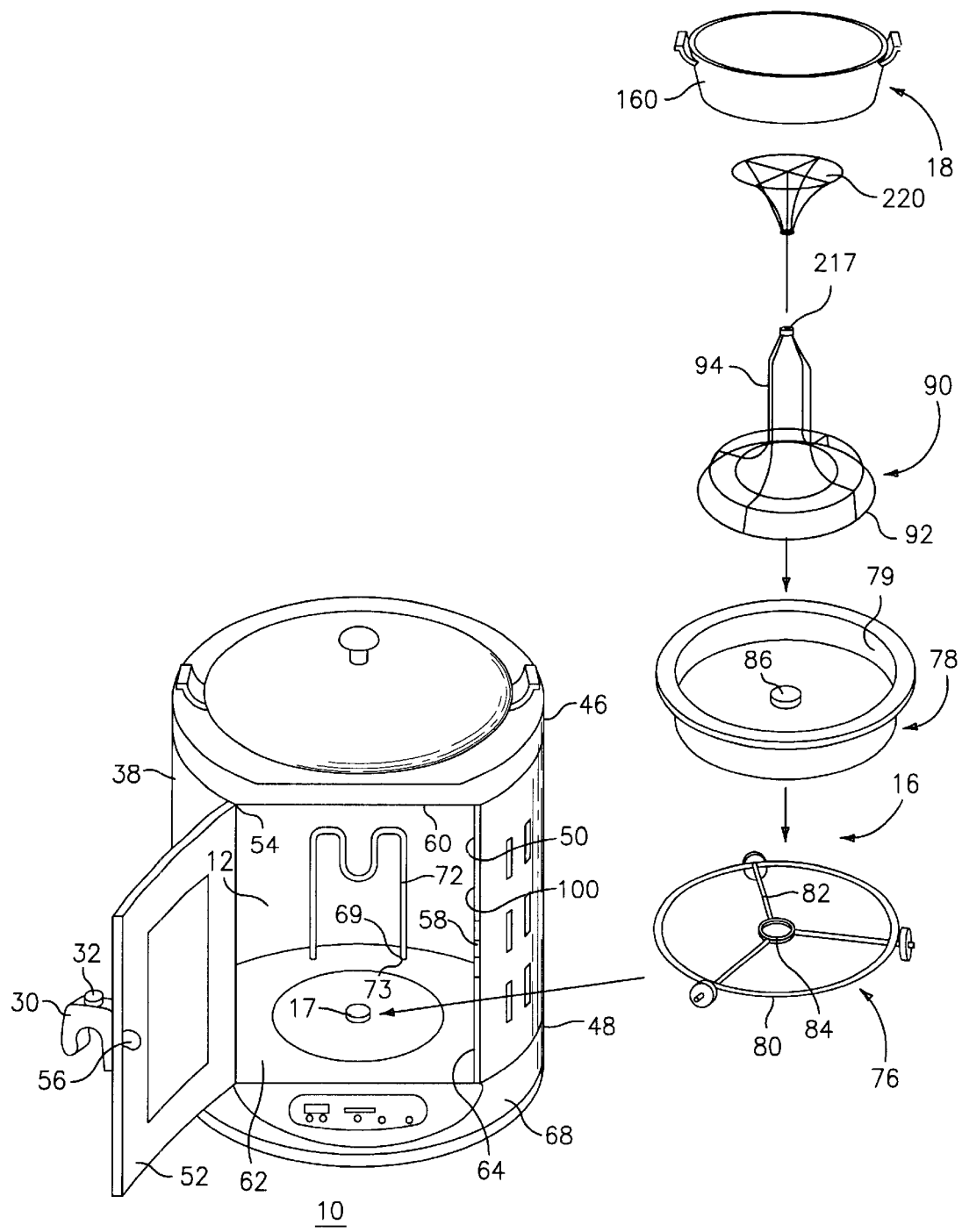
FIG. 5 is a perspective view of the rotisserie cooker unit of FIG. 1 showing an alternate embodiment of the spit assembly and heating convection assembly with parts separated.

In an alternate embodiment, as shown in FIG. 5, spit assembly 16 may engage convection heating assembly 18 to facilitate rotation thereof. Spit assembly 16 may include engagement structure, such as, for example, spit driver 217. Spit driver 217 is operatively associated with convection heating assembly 18 to rotate the assembly relative to cooking chamber 12. Spit driver 217 engages a drive pedestal 220, which, in turn, engages receptacle 160 of assembly 18 to cause rotation of convection heating assembly 18 upon rotatable actuation of spit assembly 16. Rotation of convection heating assembly 18 advantageously results in an even preparation of food articles supported within receptacle 160 of convection heating assembly 18. It is contemplated that alternatively to drive pedestal 220, a shaft, socket and drive arrangement, etc., may be used to operatively associate spit driver 217 and heating convection assembly 18. It is further contemplated that spit drive 217 may directly engage heating convection assembly 18.

Although the invention has been described with a certain degree of particularity, various modifications can be made to the embodiments disclosed herein. It is therefore to be understood that the above description should not be construed as limiting, but merely as an exemplification of the various embodiments.

What is claimed is:

1. A rotisserie appliance comprising:

a cooking chamber configured for receipt of food articles and defining a cavity;

a heating element disposed within said cooking chamber;

a spit assembly rotatably disposed within said cooking chamber, said spit assembly being configured to support food articles; and a convection heating assembly disposed remote from said heating element and having a receptacle removably supported within said cavity of said cooking chamber, said spit assembly being adapted to be selectively engageable with said convection heating assembly to facilitate rotation of said convection heating assembly with said spit assembly, and said spit assembly being adapted to be selectively disengageable from said convection heating assembly to facilitate rotation of said spit assembly independently of said convection heating assembly.

2. A rotisserie appliance according to claim 1, wherein an opening is formed in a top wall of said cooking chamber, and the receptacle is removably supported within the opening.

3. A rotisserie appliance according to claim 2, further including a drive pedestal having a first end configured to engage said receptacle and a second end configured to engage said spit assembly, wherein the drive pedestal facilitates the selective engagement of the spit assembly and the convection heating assembly.

* * * * *